May 15, 1945.  R. M. URQUHART  2,375,833
METHOD OF PRODUCING LACTEAL FOOD PRODUCTS
Filed May 7, 1940  2 Sheets—Sheet 1
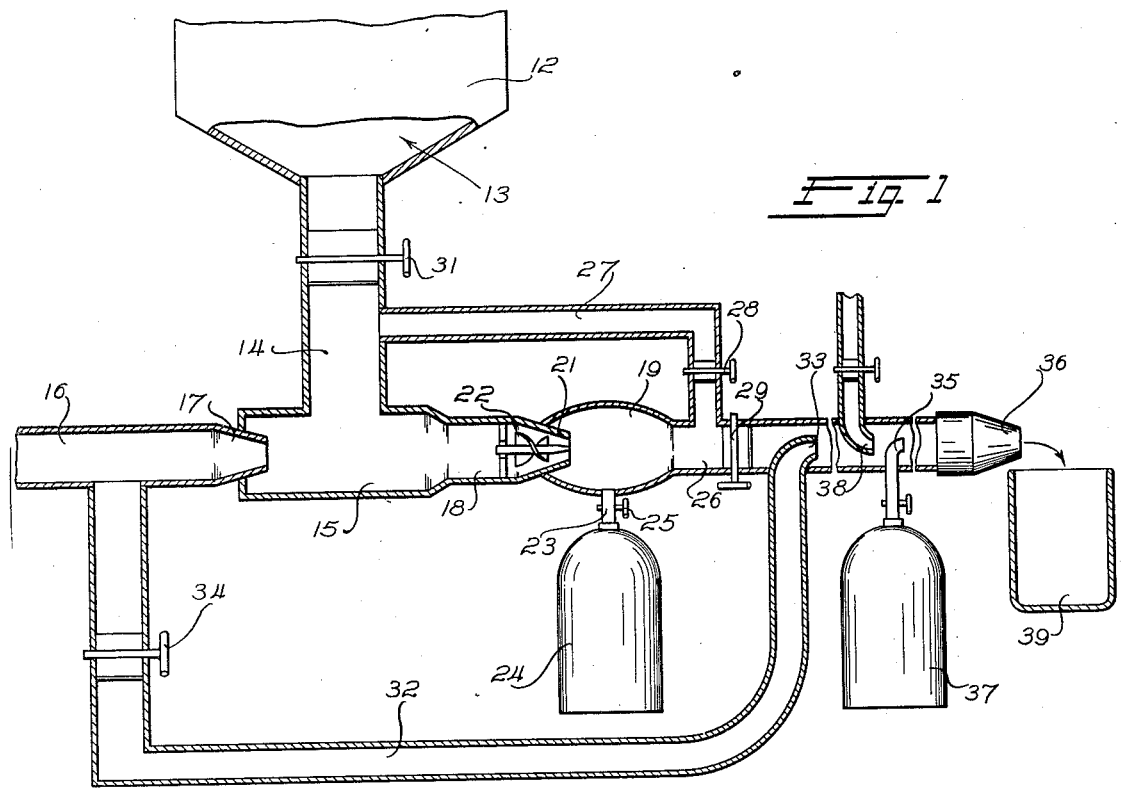
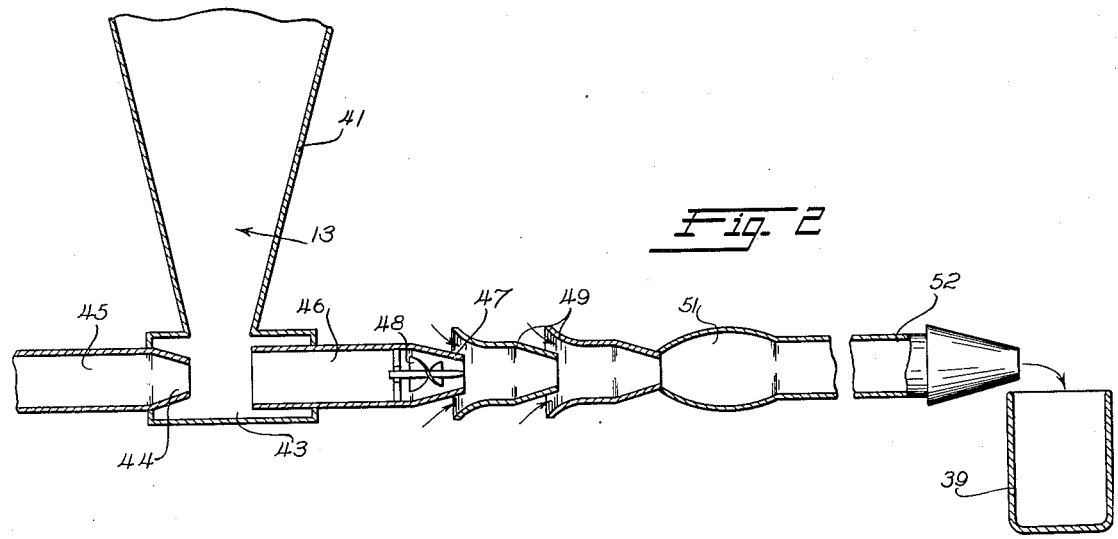
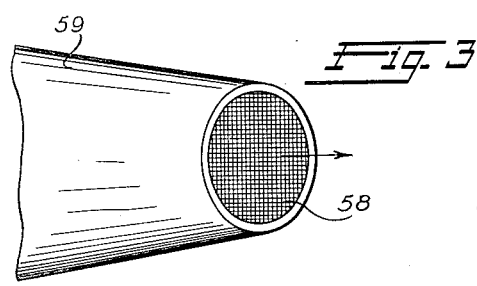
Inventor
Radcliffe Morris Urquhart
By Strauch & Hoffman
Attorneys May 15, 1945. R. M. URQUHART 2,375,833
METHOD OF PRODUCING LACTEAL FOOD PRODUCTS
Filed May 7, 1940 2 Sheets-Sheet 2

Inventor
Radcliffe Morris Urquhart

By Strauch & Hoffman
Attorneys

Patented May 15, 1945

2,375,833

UNITED STATES PATENT OFFICE 2,375,833

METHOD OF PRODUCING LACTEAL FOOD PRODUCTS

Radcliffe Morris Urquhart, Montgomeryville, Pa.

Application May 7, 1940, Serial No. 333,845

7 Claims. (Cl. 99—136)

My invention relates to a novel method of making lacteal food products, such as whipped cream, ice cream or the like, and more particularly to a novel method of aerating lacteal products such as cow's milk, having a low butter fat content so that a product of high quality and taste is produced.

Aerated food products for various purposes have been made hitherto by means of mechanical beating of a suitable liquid. In the prior art methods, the product produced has often been unsatisfactory. Furthermore, it has not been possible, in many instances, to incorporate the proper amount of air or gas to produce a product having the desired consistency. In spite of the prior efforts, the need is great for inexpensive means for making aerated food products of the proper quality for the uses for which they are intended and for varying the constituents of the products.

The primary object of my invention resides in a novel method of making an aerated food substance, which comprises emitting a liquid capable of supporting foam, in the presence of a gas, in a manner to increase the surface of said liquid exposed to said gas operatively to entrain the same, and discharging the resultant product.

A further important object of my invention is to provide new and useful means for making whipped cream, and other aerated food products.

My invention also consists of the method of producing an aerated food product, which comprises releasing a quantity of gas, in the presence of a confined foam supporting liquid, operatively to increase the pressure of said liquid, and coincidently educing said gas and said liquid and discharging the resultant product.

My invention also consists of the method of making an aerated food product which comprises the varying of the physical properties of the product by regulating the relative quantities of its constituents.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawings in which like reference characters indicate like parts, Figure 1 represents a side elevational view, partly in section, of one form of apparatus for making aerated products in accordance with my invention;

Figure 2 represents a side elevational view, partly in section, of a modified apparatus for making aerated products in accordance with my invention;

Figure 3 represents a modified construction of the surface expanding means for forming aerated products, embodied in my invention;

Figure 4:
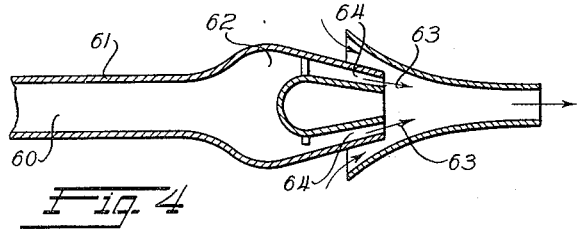
Figure 4 represents a further modified construction of the surface expanding means, embodied in my invention.

The present application is a continuation-in-part of my copending application Serial No. 144,885 filed May 26, 1937, and the applications referred to therein.

My novel method of making aerated food products, is here described for use in making whipped cream and ice cream. Thus, milk or cream may be placed in a suitable generator such as that illustrated in Figure 1, and allowed to flow into the eductor thereof, while any suitable gas under pressure is brought into contact therewith, operatively to be entrained thereby to form whipped cream or an aerated ice cream mixture. Other forms of generators, including among others those illustrated in Figures 2 and 6 of this application may, however, be used and I do not limit my invention to any of the specific forms herein illustrated.

It is thus possible by the use of my invention, to make an aerated food product of substantially whipped cream qualities without using a heavy grade of cream, or even a light grade of cream. For example, such a product may be made out of ordinary "Grade B" milk and a suitable gas such as air or carbon dioxide. Moreover, the resultant product is much superior in appearance, texture, and taste to the ordinary aerated product formed by beating a heavy grade of cream and is useful in aerating ice cream as will hereinafter be pointed out.

Figure 1 illustrates one embodiment of my invention. According to this embodiment I provide a container, such as the hopper or tank 12 for holding a pourable substance 13 such as a sweetening and flavoring agent for whipped cream or a premixed ice cream flavoring. If desired, cornstarch may be mixed in with the flavoring when using my invention to produce ice cream. A conduit 14 leads from the bottom of the container 12 to an educing or proportioning chamber 15. A lacteal foam promoting liquid, such as whole milk, milk and cream mixture or the like under pressure, is fed through an inlet conduit 16 terminating in a nozzle 17, into the educing chamber 15 wherein the substance 13 is drawn into the stream by the educing action of the flowing stream of liquid.

A discharge conduit 18 leads the resultant mixture from the educing chamber 15 into an educing chamber 19, into which it is emitted by means of a discharge nozzle 21. Suitable means, such as a spiral baffle 22 are provided in conjunction with the nozzle 21 for increasing the surface of the discharged liquid in the chamber 19. Gas, such as air, or carbon dioxide under any desired pressure is introduced into the chamber 19 by means of an inlet conduit 23 leading from a compressed gas cylinder 24. The emitted gas is preferably regulated by means of a valve 25. The mixture is drawn off from the chamber 19 by means of the primary discharge conduit 26.

A return conduit 27 is provided, leading from the discharge conduit 26 to the conduit 14, and is placed into operation by means of the opening of the valve 28 in the return conduit 27 and the partial closing of the valve 29 in the discharge conduit 26. A valve 31 is preferably provided in the conduit 14 between the juncture thereof with the return conduit 27 and the container 12, adapted to cut off the feed of flavoring substance from said container. By these means, there is formed an initial intermingling of milk or like liquid, flavoring, and gas, and then a re-introduction into said mixture of the various constituents of the mixture in proportions as desired.

Although the velocity of the flowing mixture is normally sufficient to force the foam to a point of discharge, if desired a conduit 32 may be extended from the liquid inlet 16 to a nozzle 33 in the primary discharge outlet 26, and a valve 34 inserted in said conduit 32 and adapted to close or open the flow of liquid therethrough. By the opening of the valve 34, the pressure of the mixture flowing through the discharge conduit 26 may be increased, while reducing the friction thereof against the walls of the conduit, by rendering the mixture more fluid.

A secondary inlet nozzle 35 may also be provided between the liquid nozzle 33 and the discharge opening 36 of the discharge outlet 26. This secondary nozzle 35 may lead to any source of gas under pressure, such as the container 37 or a gas compressor (not shown). The secondary inlet nozzle operates to further augment the pressure of the mixture and aid in driving it towards the point of discharge thereof, and enhance the discharge or "throw" from the opening 36. If desired air may be led into the mixture from the atmosphere by means of any suitable opening or nozzle 38 leading into the mixture before it is discharged into a suitable receiving member 39. If desired the gas and air may be filtered and sterilized before mixing with the liquid.

By my invention, it is possible to change the characteristics of the emitted food product by varying the pressure or volume of gas introduced into chamber 19. As a consequence, whipped cream and ice cream containing any desired quantities of gas or air and of varying degrees of fluidity can be obtained. By way of example, whipped cream may be produced by combining the gas and liquid in chamber 19 in a volumetric ratio of one part liquid to three parts gas at average atmospheric temperature and pressure. Such a product will be moist, relatively free-flowing and of a specific weight much greater than that of a product having a larger ratio of gas to liquid.

If a stiffer whipped cream or a full bodied ice cream is desired the gas and liquid may be combined in a ratio of seven or eight parts gas at the aforesaid temperature and pressure to one part liquid. The resultant whipped cream will be drier and non-free flowing while an ice cream formed in such proportions will be smooth, free from objectionable icy flakes and rich flavored.

A drier and still lighter whipped cream and a light weight inexpensive ice cream can be readily produced by combining the constituents in the ratio of ten parts gas at the aforesaid temperature and pressure to one part liquid. The product formed in these proportions will be quite stiff, light but bulky and relatively dry.

In using my invention for producing whipped cream, substance 13 preferably consists of a dry mixture of sugar and vanilla. If desired, a small quantity of table salt may be included to enhance the flavor in well known manner. It is to be understood, however, that unsweetened and unflavored whipped cream may be produced merely by closing valve 31.

In using my invention for making ice cream, substance 13 preferably consists of a premixed ice cream powder or a suitably prepared syrup. If a fruit cream is desired, the fruit may be finely chopped and mixed in the substance 13 or it may be folded into the aerated product in chamber 39 before it has been appreciably frozen. Chamber 39, furthermore, will be maintained at a suitable freezing temperature in any suitable and known manner In Figure 2 is illustrated a modified embodiment of my invention. According to this embodiment, a container 41 is provided for holding substance 13, and opens at its bottom into an educing chamber 43 comprising an educing nozzle 44, leading from a liquid inlet conduit 45, and a discharge outlet 46. The discharge outlet 46 leads to an educing nozzle 47 having a suitable baffle or other means 48 for increasing the surface of the liquid emitted from the nozzle into an aspirator 49; said aspirator being adapted to aspirate air from the atmosphere into the emitted mixture and to be entrained thereby. An expansion chamber 51 is provided in conjunction with the aspirator 49, and is adapted to receive the air entraining mixture and to permit a redistribution of the cellular structure of said mixture while passing through said expansion chamber 51. A discharge conduit 52 conveys the resultant aerated food product from the expansion chamber 51 to a freezing chamber or suitable storage container 39.

In operation, the substance 13 pours into the educing chamber 43 and is there educed by the jet of constantly flowing liquid emitted from nozzle 44. The mixture is then urged through the aspirator nozzle 47 in a manner to have its surface expanded, operably to entrain the air in the aspirator. The resultant mixture is led into the expansion chamber 51, where it is reformed into smaller cells, and is then led off through the discharge conduit 52.

In Figure 3 is illustrated a modified form of educing nozzle, in which means are provided for increasing the surface of the emitted liquid. According to this modified form, there is provided a screen 58 mounted within the opening of the nozzle 59 and extending across the path of the emitted liquid. The liquid is thereby broken into a multiplicity of secondary streams or droplets, all travelling in the same general direction as the initial unitary stream; and the exposed surface is greatly increased. In using this form of nozzle for manufacturing a fruit ice cream, the chopped fruit is, of course, folded into the aerated product in chamber 39.

In Figure 4 is illustrated another modified form of educing means whereby the surface of the emitted liquid is increased. According to this form, a unitary stream 60 is led through a conduit 61 into a subdivision chamber 62 where the stream is initially divided into a plurality of converging jets 63 by means of a similar number of generally converging nozzles 64. According to this embodiment of my invention, the converging streams may either conjoin after the region of initial introduction of the gas, or it may conjoin within said region, as shown. In the latter case, considerable turbulence of the liquid is occasioned by the converging streams, said turbulence operating further to increase the surface of the liquid exposed to the gas, and to enhance the entrainment thereof by means of the turbulent thrusts of the liquid particles. This form of nozzle also requires the inclusion of the chopped fruit in chamber 39.

Figure 5:
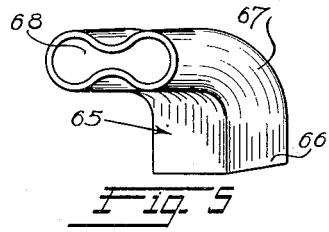
Figure 5 represents a further modified construction of the surface expanding means, embodied in my invention.

In Figure 5 is illustrated a further modified embodiment of educing means. In this embodiment, I provide a nozzle 65 of irregular contour, having a liquid inlet 66, a bent portion 67 and a pinched nozzle outlet 68, said pinched outlet being curved to any desired configuration. Such a nozzle operates to twist the emitted stream in a manner to entrain more gas than a straight, unbroken jet, and generally operates to subdivide the stream as well; thereby to entrain more gas.

Figure 6:
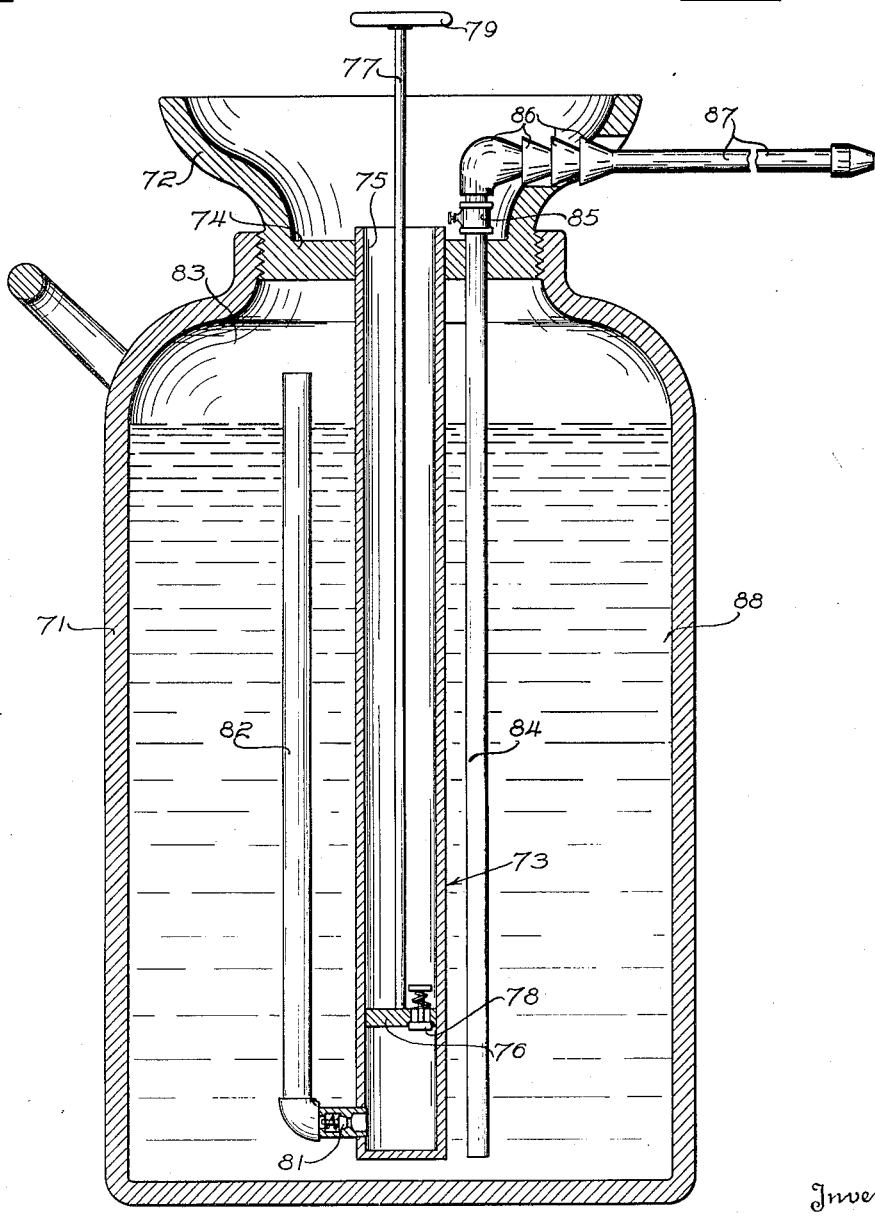
Figure 6 represents a vertical sectional view of an apparatus of another modified construction, for forming aerated products in accordance with my invention.

In Figure 6 is shown a generator of another modified construction, embodying my invention. This form of the invention, due to its simplicity and the inexpensive structure is particularly adapted to home use or use in small lunch rooms, ice cream stores and the like where the apparatus of Figures 1 to 5 would be too complex or expensive. This form of the invention is likewise useable for producing either whipped cream or ice cream.

According to this form of my invention, I provide a container 71 and cap 72. An air pump 73 adapted to pump air from the atmosphere, is mounted on, and extends through, the base 74 of the cap 72. This air pump may be of any conventional type, such as that shown, comprising a cylinder 75, piston 76, piston rod 77 and inlet valve 78, piston handle 79 and outlet check valve 81. An outlet conduit 82 leads from the outlet check valve 81 to a region near the upper part 83 of the container 71. If desired, however, cylinder 75 at its upper end may be provided with a conventional air valve to adapt this form of the invention to the use of a compressed air hose or other available external source of air under pressure.

A liquid discharge conduit 84 including a control valve 85 extends through the base 74 of the cap 72 to a region near the bottom of the container 71, and leads at its upper end into an aspirator 86 adapted to aspirate air from the atmosphere into a discharge conduit 87, by means of the flow of liquid therethrough. This aspirator may be of a type similar to that shown in Figures 1 and 2.

According to this form of my invention, the container 71 is charged with an ice cream mix or milk 88, containing, if desired, a suitable flavoring and sugar, to a point below the upper end of the outlet conduit 82, and the cap 72 sealed to the container 71. When it is desired to operate the generator, valve 85 is closed and the hand pump 73 is operated by means of the handle 79, thereby forcing air under pressure into the upper region 83 of container 71, operatively to exert pressure on the liquid 88 in said container. When a suitable pressure is built up, valve 85 is opened and liquid 88 is urged upwardly through the discharge conduit 84 and through the aspirator 86. The liquid, in passing through the aspirator 86, has its surface expanded in transit by suitable means such as those already described, thereby to entrain a greater amount of air from the atmosphere, operatively to cause subdivision of the mixture into a cellular form. This cellular product is conveyed through the discharge tube and out of the discharge nozzle to a storage or freezing device as may be desired.

In using this form of the invention for making ice cream, the ice cream flavoring and milk or milk and cream mixture are preferably mixed together to form substance 88. Finely chopped fruit or the like may be incorporated in the substance 88 or may be added to the aerated product after it is emitted from nozzle 89. Since most homes, lunch rooms and the like are now equipped with mechanical refrigerators, the issuing aerated product is merely discharged into the freezing trays of the refrigerator and left to freeze. No stirring or beating of the aerated ice cream mixture in the freezing trays is necessary since the apparatus of this invention assures the proper aeration of the mixture and a smooth product. Furthermore, since the moisture content of the aerated product can be predetermined by proper design of the aspirator 86, a product free from objectionable icy flakes is assured.

While the fresh fruits or nuts and flavoring may be incorporated in the manner previously pointed out, it is to be understood that these substances may be incorporated in any other suitable manner. For example, the flavoring, fruit or nuts may be introduced into the aerated product at the point of aeration or just beyond this point and discharged through the nozzle on conduit 87. This same manner of introducing the flavor may be resorted to in the other forms of the invention. In this connection the container 37 may, if desired, be used to introduce the flavoring, fruit or nuts. It will be clear, therefore, that the apparatus and method as pointed out above makes it possible for the operator to change the flavor at will.

Furthermore, in referring to air under pressure, it is intended that this term include air at any pressure equal to or greater than the pressure of the medium into which the aerated product is discharged.

Since the quality of whipped cream or ice cream is largely determined by the quantity of air incorporated therein, it will be readily appreciated that the present invention provides an extremely efficient and inexpensive method of producing these products and that the simplicity of the apparatus and the absence of complicated moving parts likely to wear out makes the present invention extremely desirable for both commercial and home use.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of producing a lacteal food product which comprises generating a flowing unfrozen stream of liquid containing lacteal, foam forming food solids; dispersing said stream of liquid to increase the surface area thereof; and incorporating a gas by the aspirating action of said stream into said dispersed stream to form a food foam.

2. The method of making a lacteal food product which comprises generating an unfrozen stream of liquid containing lacteal, food foam forming substances; and projecting said stream in the form of a spray into association with a gas to form a lacteal food foam product incorporating said gas.

3. A method of producing a lacteal food product which comprises generating a flowing stream of lacteal liquid; incorporating a flavoring substance in predetermined proportion into said stream; dispersing said stream; and entraining gas by Venturi action into said dispersed stream to form a cellular, gas containing, lacteal food structure.

4. The method as set forth in claim 3 in which said flavoring substance is introduced into said stream in powdered form.

5. The method as set forth in claim 3 in which said flavoring substance is incorporated in said stream in the form of a syrup.

6. The method of producing a lacteal food product which comprises generating a flowing stream of liquid lacteal food substance; entraining flavoring substance in said stream by Venturi action; projecting the resulting stream of liquid and flavoring substance in dispersed form; and entraining a gas into said dispersed stream by Venturi action to form a cellular, gas containing, lacteal food product.

7. The method as set forth in claim 6 together with the further step of freezing said cellular gas containing food product.

RADCLIFFE MORRIS URQUHART.